3,567,366
Patented Mar. 2, 1971

3,567,366
SHORT CHAIN HYDROXYALKYL-, LONG CHAIN ALKYL SULFONIUM SALT ASSISTED DYEING OF NYLON WITH ANIONIC DYES
Hermann Sand, Wachenheim, Pfalz, Harry Distler, Ludwigshafen (Rhine), and Willibald Ender, Heidelberg, Germany, assignors to Badische Anilin- & Soda-Fabrik Aktiengesellschaft, Ludwigshafen (Rhine), Germany
No Drawing. Filed Feb. 5, 1968, Ser. No. 702,788
Claims priority, application Germany, Feb. 14, 1967, P 16 19 359.2
Int. Cl. D06p 5/02
U.S. Cl. 8—173     8 Claims

ABSTRACT OF THE DISCLOSURE

Process for dyeing or printing textile material of linear polyamide fibers with anionic azo dyes having from one to four sulfonic acid groups in which a tertiary trialkyl sulfonium salt is used as a dyeing assistant, the sulfur atom of the sulfonium salt being substituted by one or two hydroxyalkyl or dihydroxyalkyl substituents of 2 to 3 carbon atoms of the $\alpha$-carbamoylmethyl-$\beta$-hydroxyethyl group with the remaining sulfur substituent being alkyl of 8 to 16 carbon atoms and one of the first mentioned substituents or groups being replaceable by methyl or ethyl.

---

In bath dyeing of polyamide textile material with anionic dyes it is the usual custom to use neutral to acid liquors. Depending on the pH value and the dye, more or less full dyeings are obtained, and particularly dyes having more than one anionic group go on sufficiently only from acid liquors. In the case of certain synthetic polyamides, for example of the nylon 6 and nylon 6,6 types, the depth of color which can be achieved in the neutral or acid pH range is limited and it has been desirable to find a method with which any desired depth of shade can be achieved with anionic dyes. It is known that under conventional dyeing conditions the rate of absorption of anionic dyes can be slowed down by adding cationic assistants and it is also known that only weak dyeings or none at all are obtained on polyamides with anionic dyes in the neutral to weakly alkaline range.

We have now found that, surprisingly, synthetic polyamides can be dyed with anionic dyes in full shades from weakly acid to weakly alkaline liquors by previously or simultaneously treating the polyamide with an aqueous solution of a tertiary sulfonium compound having the general formula I:

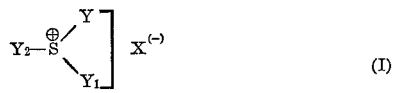

in which:

Y denotes a hydroxyalkyl or dihydroxyalkyl group having 1 to 4 carbon atoms,
$Y_1$ denotes a methyl, ethyl, hydroxyalkyl or dihydroxyalkyl group, the alkyl groups having 1 to 4 carbon atoms, or a substituted hydroxyalkyl group having 1 to 4 carbon atoms,
$Y_2$ denotes an alkyl group having 8 to 16 carbon atoms and
$X^\ominus$ denotes an anion.

Specific examples of suitable substituents Y are $\beta$-hydroxyethyl, $\beta$-hydroxypropyl, $\gamma$-hydroxypropyl, $\alpha$-carbamoylmethyl-$\beta$-hydroxyethyl and $\beta$-$\gamma$-dihydroxypropyl; $\beta$-hydroxyethyl radicals are preferred.

Examples of alkyl radicals $Y_2$ having 8 to 16 carbon atoms are octyl, decyl and lauryl.

It is advantageous to use a mixture of formula I compounds in which the alkyl radical $Y_2$ has a chain length of $C_{11}$ to $C_{14}$.

Suitable anions are simple or complex organic or inorganic acid radicals. Examples are the sulfate, methyl sulfate, ethyl sulfate or para-toluenesulfonate anions.

Examples of compounds having the Formula I are:

$C_{11-15}$-alkyl-dihydroxyethylsulfonium sulfate,
lauryl-$\beta$-hydroxyethylmethylsulfonium methyl sulfate,
octyl-($\alpha$-carbamoylmethyl-$\beta$-hydroxyethyl)-$\beta$-hydroxyethylsulfonium sulfate, and
lauryl-$\beta$-hydroxyethyl ethylsulfonium ethyl sulfate.

Particularly suitable anionic dyes are azo dyes of the benzene, naphthalene or pyrazolone series having one to four sulfonic acid groups.

Anionic dyes which could not be used under the dyeing conditions hitherto known are also suitable according to the new process. From the large selection of dyes, the following compounds are given by way of example. The numbers given are their Color Index (C.I.) numbers: 13,015; 19,140; 13,065; 15,510; 15,575; 17,925; 16,230; 18,050; 14,900; 14,835; 16,045; 16,180; 16,255; 16,250; 16,185; 14,330; 18,965; and 16,290.

Tertiary sulfonium compounds to be added according to the invention are advantageously used in amounts of 0.5 to 10%, preferably 2 to 5%, with reference to the weight of the textile material. They may be allowed to be absorbed by the fiber previously or simultaneously with the dye, the second alternative being the more advantageous. Conditions for the absorption of the ammonium compounds are those used for dyeing polyamides but it is advantageous to maintain a pH of from 5 to 9. After treatment for half an hour with 3% of tannin and 1% of aqueous acetic acid at 70° C. and then with 2.5% of tartar emetic will enhance the wet fastness of the dyeings.

Better exhaustion of the dye liquor is achieved by the new process and the risk of damage to the fiber and of corrosion of the dyeing machines are lessened (such a risk being present in the case of acid dyeing methods).

In printing polyamide textile material, the compound having the Formula I may be added to the print pastes (otherwise unchanged) in amounts such as are advantageous when dyeing with dye liquor. A more extensive fixing of the dye of the print paste is thus achieved together with an increased brightness of the dyeing.

Polyamides according to this invention include for example nylon 6, nylon 6,6 or fiber-forming condensation products of $C_6$, $C_8$ or $C_{12}$ diamines with appropriate dicarboxylic acids which are constituted according to the same chemical principles. The polyamide fibers may also be pretreated, for example texturized.

The invention is illustrated by the following examples in which the parts and percentages specified are by weight.

EXAMPLES 1–8

100 parts of polyamide fiber textile material is introduced at 50° C. into a liquor containing 4 parts of sulfonium compound and 2 parts of dye in 4000 parts of water. The whole is heated to 95° C. and dyeing is carried out for one hour. The dyes and sulfonium compounds given in the following table are used. The liquor exhaustion achieved is indicated in percent in the right-hand column, the figures in parentheses being obtained when no sulfonium compound is used.

TABLE

| Example No. | Dye | Sulfonium compound | Liquor exhaustion |
|---|---|---|---|
| 1 | C.I. 15985 | $\left[ C_{11-14}\text{-alkyl}-\overset{\oplus}{S} \diagup\!\!\!\diagdown \begin{array}{c} CH_2-CH_2-OH \\ CH_2-CH_2-OH \end{array} \right]_2 SO_4{}^{2\ominus}$ | 31% (8.6%) |
| 2 | C.I. 15985 | $\left[ C_{11-14}\text{-alkyl}-\overset{\oplus}{S} \diagup\!\!\!\diagdown \begin{array}{c} CH_2-CH_2-OH \\ CH_3 \end{array} \right] CH_3SO_4{}^{\ominus}$ | 57% (8.6%) |
| 3 | C.I. 15985 | $\left[ C_{11-14}\text{-alkyl}-\overset{\oplus}{S} \diagup\!\!\!\diagdown \begin{array}{c} CH_2-CH_2-OH \\ CH-CH_2-OH \\ \mid \\ CH_2-CO-NH_2 \end{array} \right]_2 SO_4{}^{2\ominus}$ | 53% (8.6%) |
| 4 | C.I. 15985 | $\left[ C_8H_{17}-\overset{\oplus}{S} \diagup\!\!\!\diagdown \begin{array}{c} CH_2-CH_2-OH \\ CH-CH_2-OH \\ \mid \\ CH_2-CO-NH_2 \end{array} \right]_2 SO_4{}^{2\ominus}$ | 62% (8.6%) |
| 5 | C.I. 15510 | Same as above | 85% (28%) |
| 6 | C.I. 16255 | do | 55% (7%) |
| 7 | C.I. 16230 | do | 52% (7%) |
| 8 | C.I. 16045 | do | 76% (17%) |

We claim:

1. In a process of dyeing and printing synthetic polyamides with anionic dyes, the improvement of applying an anionic dye to fibers of a synthetic linear polyamide under weakly acid to alkaline conditions and in the presence of at least one tertiary sulfonium compound having the formula

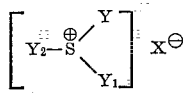

in which
Y denotes a substituent selected from the class consisting of hydroxyalkyl and dihydroxyalkyl of 2 to 3 carbon atoms,
$Y_1$ denotes a substituent selected from the class consisting of methyl, ethyl, hydroxyalkyl and dihydroxyalkyl of 2 to 3 carbon atoms,
$Y_2$ denotes alkyl of 8 to 16 carbon atoms, and
$X^\ominus$ denotes an anion.

2. A process as claimed in claim 1 wherein the polyamide fibers consist essentially of nylon 6 or nylon 6,6.

3. A process as claimed in claim 2 wherein said polyamide fibers are dyed from an aqueous liquor with an anionic dye selected from the class consisting of azo dyes having from one to four sulfonic acid groups.

4. A process as claimed in claim 1 wherein said dye is applied at a pH value of from 5 to 9.

5. A process as claimed in claim 1 wherein the dyed polyamide fibers are first aftertreated with tannin and acetic acid and then with tartar emetic.

6. A process as claimed in claim 1 wherein the amount of the tertiary sulfonium compound absorbed on the fibers is about 0.5 to 10% by weight with reference to the weight of the fibers.

7. A process as claimed in claim 6 wherein said amount of the tertiary sulfonium compound is about 2 to 5% by weight.

8. A process as claimed in claim 1 wherein polyamide fibers consisting essentially of nylon 6 or nylon 6,6 are dyed from an aqueous bath of an anionic dye selected from the class consisting of azo dyes having from one to four sulfonic acid groups in the presence of a compound selected from the class consisting of

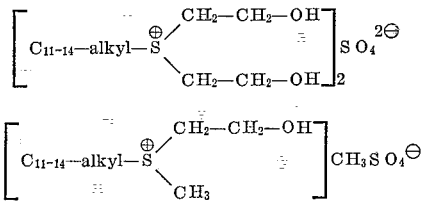

References Cited

UNITED STATES PATENTS

| | | | |
|---|---|---|---|
| 2,193,963 | 3/1940 | Harris | 260—607B |
| 2,989,360 | 6/1961 | Mautner | 8—85X |
| 3,251,642 | 5/1966 | Valentine | 8—94.33 |

OTHER REFERENCES

German Auslegeschuft, No. 1,174,312, May 4, 1962, 3 pages.

DONALD LEVY, Primary Examiner

U.S. Cl. X.R.

8—41, 42, 65, 165